E. G. HAYNE.
SHOCK ABSORBER.
APPLICATION FILED JUNE 30, 1914.
1,143,906.
Patented June 22, 1915.
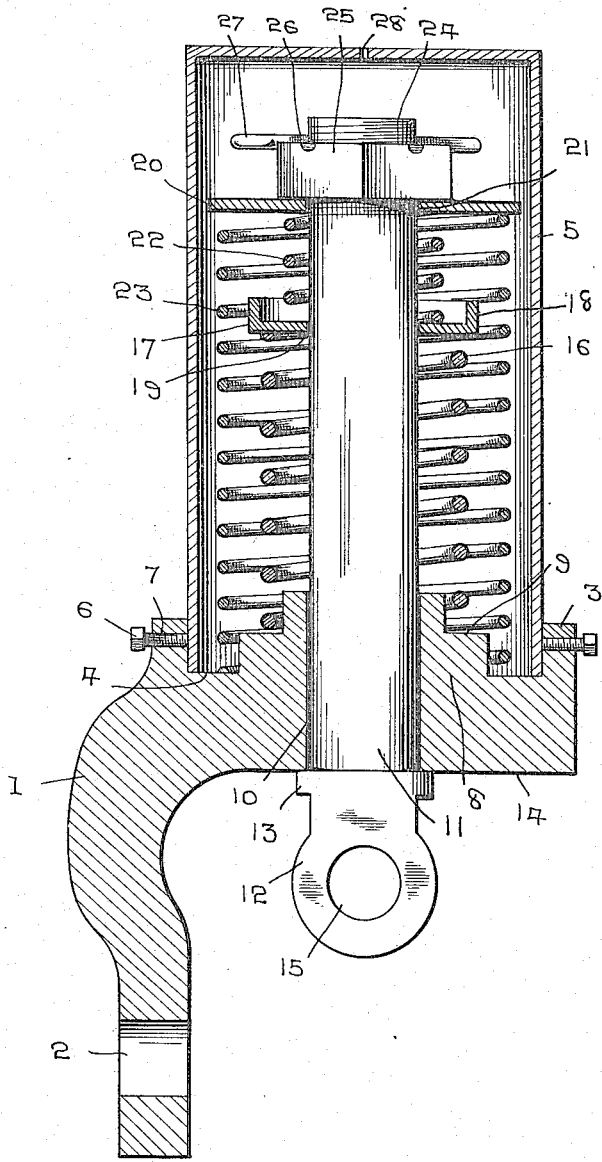

UNITED STATES PATENT OFFICE.

EDWARD G. HAYNE, OF OTTAWA, ILLINOIS.

SHOCK-ABSORBER.

1,143,906.  Specification of Letters Patent.  Patented June 22, 1915.

Application filed June 30, 1914. Serial No. 848,262.

*To all whom it may concern:*

Be it known that I, EDWARD G. HAYNE, a citizen of the United States, residing at Ottawa, in the county of La Salle and State of Illinois, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers and in particular to spring shock absorbers.

One of the objects of this invention is to provide a device that will absorb the light shocks received.

Another object of this invention is to provide a device that will absorb heavy shocks independently of the means that will absorb the light shocks.

Still another object of this invention is to provide a device whereby the means for absorbing the light shocks and the means for absorbing the heavy shocks will not rattle while in operation.

Other objects and advantages of this invention will be hereinafter more clearly set forth in the specifications and pointed out in the claims.

Similar characters of reference refer to similar parts throughout the drawings, in which the figure is a sectional elevational view of this device in assembled formation.

Referring to the drawing, 1 is the bracket to this device having the aperture 2 therethrough adapted to be suitably fastened to an automobile. This bracket 1 combines to form the base of the shock absorber, having thereto the exterior flanges 3 and a recess 4 adapted to seat the casing or cup 5 of this device, said casing or cup snugly fitting within the inner face of the flange 3 and is locked against movement thereby by a plurality of threaded bolts 6, said bolts locking said cup 5 in position through suitable apertures 7 within the flanges 3.

A central hub 8 is formed in said bracket having an offset portion 9 therein adapted to seat a spring hereinafter more fully described. A comparatively large sized aperture or spindle bore 10 is formed through said bracket in the center of said hub, and a spindle 11 is mounted therein having a head portion 12 thereof, said head portion being slightly enlarged in diameter to that of the balance of the spindle to thereby form an annular collar 13, said collar abutting against the outer surface 14 of the bracket. An aperture 15 is struck through the center portion of the head part 12 to allow said spindle to be connected to a shock receiving means upon the automobile, in most instances, the axle of the automobile.

A stiff spring 16 of a comparatively small diameter coil is mounted upon said spindle, one end of which is seated in said offset portion 9 previously noted. And a washer 17, having an upturned flange end 18 with a central bore 19, is mounted upon said spindle and contacts with the opposite end of said spring 16. A second washer or plate 20 having the central bore 21 therethrough is likewise mounted upon said spindle 11, and a light spring 22 is placed between said washer 17 and said second mentioned washer or plate 20 in such manner that upon compression of the device, the spring 22 will be protected between the washer or plate 20 and the upturned flange edge 18 of the washer 17. A third spring 23 is mounted around said spindle, one end of which being seated in the recess 4 previously noted, and the opposite end contacting with the washer or plate 20, said spring being of a larger diameter coil than the spring 16 previously noted, and consisting of comparatively limber or resilient metal.

The end of the spindle 11 is threaded as at 24, and is adapted to threadly seat a nut 25, said nut having a plurality of recessed edges 26 thereto adapted to seat a pin or other form of fastening device 27 which is run through a suitable aperture in the spindle 11, the end portions of which are seated in said recesses 26. This nut contacts with the washer or plate 20 and is adapted to adjustably position said washer or plate, and accordingly the pressure of said springs.

A suitable air vent 28 is had in the top portion of the cup which also allows, if desired, of the reception of oil. In operation the bracket portion is suitably attached to the body of the automobile or other vehicle, upon which it is used, by means of the aperture 2, and the spindle 11 is attached to the axle or other shock receiving means upon the automobile so that said spindle can reciprocate back and forth within said casing or cup 5. Upon the reception of a light shock the same is absorbed by the resilient spring 23, while upon the reception of the heavy shock the same is absorbed by stiff heavy spring 16, said heavy shock being first absorbed by the lighter spring so that when the stiff spring 16 becomes actuated there will not be a sudden jar or like action to keep the parts from rattling the spring 22, previously noted, spreads the washers 17 and 20 apart and against their respective springs.

Having now described my invention what I claim as new and desire to secure by Letters Patent is,

1. A shock absorber comprising; a bracket, a casing mounted upon said bracket, a reciprocating spindle mounted in said bracket, a stiff spring mounted around said spindle of comparatively small diameter coil, a washer having upturned flange edges mounted upon said stiff spring, a second spring of resilient metal of comparatively large diameter mounted to encircle said spindle and said first mentioned spring, a second washer mounting said spindle and contacting with said last mentioned spring, and a third smaller spring mounted between said washers and protected by the upturned flange edges thereof to spread said washers apart.

2. A shock absorber comprising; a bracket having a bore therethrough, a spindle reciprocatingly mounted through said bore, a stiff spring adapted to receive heavy shocks mounted upon said bracket and encircling said spindle for a portion of its length, a cup-like washer slidingly mounted upon said spindle and engaging the end of said spring, a second light spring encircling the balance of said spindle and seated in said washer adapted to retain said washer and said stiff spring in place without compression and from rattling, means upon the end of said spindle to retain said second mentioned spring in place, and a third spring adapted to receive light shocks encircling both of said first mentioned springs and retained between said bracket and said retaining means upon the end of the spindle.

In testimony whereof I have signed my name to this specification in the presence of two subscribing witnesses.

EDWARD G. HAYNE.

Witnesses:
W. I. HARRIS,
C. F. MICK.

Copies of this patent may be obtained for five cents each, by addressing the "Commissioner of Patents, Washington, D. C."